(12) United States Patent
Vorberg et al.

(10) Patent No.: US 8,221,712 B2
(45) Date of Patent: Jul. 17, 2012

(54) ABSORPTION MEDIUM FOR THE SELECTIVE REMOVAL OF HYDROGEN SULFIDE FROM FLUID STREAMS

(75) Inventors: Gerald Vorberg, Speyer (DE); Torsten Katz, Neustadt (DE); Georg Sieder, Bad Dürkheim (DE); Christian Riemann, Altrip (DE); Erika Dengler, Böhl-Iggelheim (DE)

(73) Assignee: BASF SE, Ludwigshafen (DE)

( * ) Notice: Subject to any disclaimer, the term of this patent is extended or adjusted under 35 U.S.C. 154(b) by 203 days.

(21) Appl. No.: 12/576,277

(22) Filed: Oct. 9, 2009

(65) Prior Publication Data

US 2010/0288125 A1    Nov. 18, 2010

(30) Foreign Application Priority Data

May 12, 2009    (EP) .................................... 09160039

(51) Int. Cl.
*C07F 9/38* (2006.01)
*B01D 53/14* (2006.01)
*B01D 53/46* (2006.01)
*B01D 53/48* (2006.01)
*B01D 53/54* (2006.01)
*B01D 53/62* (2006.01)
*B01D 53/68* (2006.01)

(52) U.S. Cl. ........ 423/223; 423/226; 423/228; 423/235; 423/240 R; 423/242.1; 252/190; 562/10; 562/12; 562/13; 562/16; 562/22

(58) Field of Classification Search .................. 252/190; 562/8, 10, 11, 12, 13, 16, 20, 21, 22; 423/220, 423/223, 226, 228, 235, 240 R, 242.1, 242.2, 423/242.3, 242.4, 242.7, 245.1, 246
See application file for complete search history.

(56) References Cited

U.S. PATENT DOCUMENTS

| | | | |
|---|---|---|---|
| 4,336,233 A | 6/1982 | Appl et al. | |
| 4,537,753 A | 8/1985 | Wagner et al. | |
| 4,551,158 A | 11/1985 | Wagner et al. | |
| 4,553,984 A | 11/1985 | Volkamer et al. | |
| 2006/0089281 A1* | 4/2006 | Gibson | ........................ 510/201 |

FOREIGN PATENT DOCUMENTS

| | | |
|---|---|---|
| DE | 100 28 637 A1 | 12/2001 |
| EP | 0 121 109 A2 | 10/1984 |
| EP | 134 948 A2 | 3/1985 |

(Continued)

OTHER PUBLICATIONS

ClearTech Industries, Inc., "Material Safety Data Sheet, Dequest 2010." (2004).*

*Primary Examiner* — Stuart Hendrickson
*Assistant Examiner* — Daniel Berns
(74) *Attorney, Agent, or Firm* — Connolly Bove Lodge & Hutz LLP

(57) ABSTRACT

An absorption medium for the removal of acid gases from a fluid stream comprises an aqueous solution a) of at least one amine and b) at least one phosphonic acid, wherein the molar ratio of b) to a) is in the range from 0.0005 to 1.0. The phosphonic acid is, e.g., 1-hydroxyethane-1,1-diphosphonic acid. The absorption medium exhibits a reduced regeneration energy requirement compared with absorption media based on amines or amine/promoter combinations, without significantly decreasing the absorption capacity of the solution for acid gases.

18 Claims, 1 Drawing Sheet

FOREIGN PATENT DOCUMENTS

| | | |
|---|---|---|
| EP | 0 159 495 A2 | 10/1985 |
| EP | 0 190 434 A2 | 8/1986 |
| EP | 0 202 600 A2 | 11/1986 |
| EP | 0 359 991 A1 | 3/1990 |
| WO | WO-00/00271 | 1/2000 |
| WO | WO/2009/156271 A1 | 12/2009 |
| WO | WO/2009/156273 A1 | 12/2009 |
| WO | WO/2010/196133 A1 | 9/2010 |

\* cited by examiner

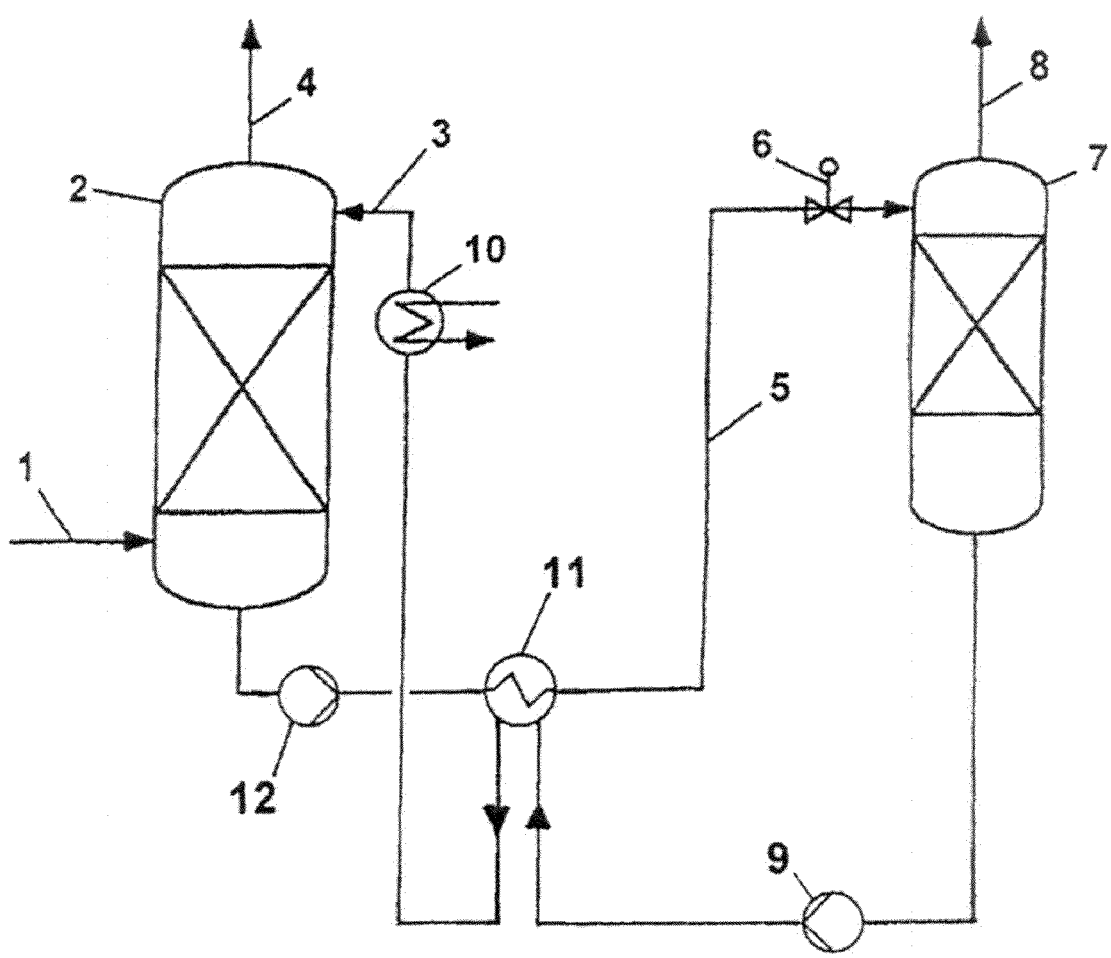

ABSORPTION MEDIUM FOR THE SELECTIVE REMOVAL OF HYDROGEN SULFIDE FROM FLUID STREAMS

CROSS REFERENCE TO RELATED APPLICATIONS

This application claims priority to EP 09 160 039.5 filed May 12, 2009, the entire contents of which are hereby incorporated by reference.

The present invention relates to an absorption medium for the removal of acid gases from fluid streams, in particular for the selective removal of hydrogen sulfide from fluid streams, and to a process for the removal of acid gases from a fluid stream.

The removal of acid gases such as, e.g. $CO_2$, $H_2S$, $SO_2$, $CS_2$, HCN, COS or mercaptans, from fluid streams such as natural gas, refinery gas, synthesis gas, is of importance for differing reasons. The sulfur compound content of natural gas must be reduced by suitable workup measures directly at the natural gas well since the sulfur compounds form, in the water which is frequently entrained by the natural gas, acids which are corrosive. For transporting the natural gas in a pipeline or further processing thereof in a natural gas liquefaction plant, therefore preset limiting values of the sulfur-comprising impurities must be maintained. Reduction of the content of carbon dioxide is frequently required to establish a preset calorific value.

For removal of acid gases, scrubbing with aqueous solutions of inorganic or organic bases is used. On dissolution of acid gases in the absorption medium, ions form with the bases. The absorption medium can be regenerated by expansion to a lower pressure and/or by stripping, wherein the ionic species react back to form acid gases and/or are stripped off using steam. After the regeneration process the absorption medium can be reused.

A process in which all acid gases, in particular $CO_2$ and $H_2S$, are removed as completely as possible is also termed "total absorption". In certain cases, however, it can be desirable to absorb $H_2S$ preferentially before $CO_2$ in order to obtained a calorific value-optimized $CO_2/H_2S$ ratio for a downstream Claus plant. In this case, "selective scrubbing" is spoken of. An unfavorable $CO_2/H_2S$ ratio can impair the performance and efficiency of the Claus plant by the formation of $COS/CS_2$ and coking of the Claus catalyst or by a heating value which is too low.

Tertiary amines, such as methyldiethanolamine (MDEA), or sterically hindered amines exhibit kinetic selectivity to $H_2S$ over $CO_2$. These amines do not react directly with $CO_2$; rather, $CO_2$ is reacted in a slow reaction with the amine and water to form bicarbonate. Tertiary amines are therefore suitable, in particular, for selective removal of $H_2S$ from gas mixtures which comprise $CO_2$ and $H_2S$.

The absorption rate of $CO_2$ in aqueous solutions of tertiary alkanolamines can be increased by adding further compounds which are called activators or promoters. One of the most effective absorption liquids for the removal of $CO_2$ and $H_2S$ from a gas stream is an aqueous solution of methyldiethanolamine (MDEA) and piperazine as promoter. Such an absorption medium is known from U.S. Pat. No. 4,336,233.

Primary amines, such as monoethanolamine (MEA), and secondary amines, such as diethanolamine (DEA) or diisopropanolamine (DIPA), can react directly with $CO_2$ in a faster reaction. These amines exhibit a markedly lower $H_2S$ selectivity. Owing to the high affinity thereof for acid gases, they can also be used for scrubbing gas streams having a low acid gas partial pressure. However, a high specific regeneration energy is correlated with the high affinity for acid gases.

EP-A 134 948 describes an absorption medium which comprises an alkaline material and an acid having a $pK_a$ of 6 or below. Preferred acids are phosphoric acid, formic acid or hydrochloric acid. The addition of acid is intended to make, in particular the stripping of $H_2S$-comprising acid gases more efficient.

The object of the invention is to specify a process and an absorption medium for the removal of acid gases from fluid streams, which process exhibits, in comparison with absorption media based on amines and/or amine/promoter combinations, a reduced regeneration energy requirement, without significantly decreasing the absorption capacity of the solution for acid gases.

The object is achieved by an absorption medium for the removal of acid gases from a fluid stream which comprises an aqueous solution
a) of at least one amine and
b) at least one phosphonic acid,
wherein the molar ratio of b) to a) is in the range from 0.0005 to 1.0, preferably 0.01 to 0.1, in particular 0.02 to 0.09.

The absorption medium according to the invention comprises at least one organic phosphonic acid.

Suitable phosphonic acids are, for example, phosphonic acids of the formula I

$$R-PO_3H \qquad (I)$$

where R is $C_1$-$C_{18}$-alkyl, which is optionally substituted by up to four substituents which are independently selected from carboxyl, carboxamido, hydroxy and amino.

These include alkylphosphonic acids, such as methylphosphonic acid, propylphosphonic acid, 2-methylpropylphosphonic acid, t-butylphosphonic acid, n-butylphosphonic acid, 2,3-dimethylbutylphosphonic acid, octylphosphonic acid; hydroxyalkylphosphonic acids, such as hydroxymethylphosphonic acid, 1-hydroxyethylphosphonic acid, 2-hydroxyethylphosphonic acid; arylphosphonic acids such as phenylphosphonic acid, toluoylphosphonic acid, xylylphosphonic acid, aminoalkylphosphonic acids such as aminomethylphosphonic acid, 1-aminoethylphosphonic acid, 1-dimethylaminoethylphosphonic acid, 2-aminoethylphosphonic acid, 2-(N-methylamino)ethylphosphonic acid, 3-aminopropylphosphonic acid, 2-aminopropylphosphonic acid, 1-aminopropylphosphonic acid, 1-aminopropyl-2-chloropropylphosphonic acid, 2-aminobutylphosphonic acid, 3-aminobutylphosphonic acid, 1-aminobutylphosphonic acid, 4-aminobutylphosphonic acid, 2-aminopentylphosphonic acid, 5-aminopentylphosphonic acid, 2-aminohexylphosphonic acid, 5-aminohexylphosphonic acid, 2-aminooctylphosphonic acid, 1-aminooctylphosphonic acid, 1-aminobutylphosphonic acid; amidoalkylphosphonic acids such as 3-hydroxymethylamino-3-oxopropylphosphonic acid; and phosphonocarboxylic acids such as 2-hydroxyphosphonoacetic acid and 2-phosphonobutane-1,2,4-tricarboxylic acid.

Phosphonic acids of the formula II

(II)

where R' is H or $C_{1-6}$-alkyl, Q is H, OH or $NY_2$ and Y is H or $CH_2PO_3H_2$, such as 1-hydroxyethane-1,1-diphosphonic acid.

Phosphonic acids of the formula III

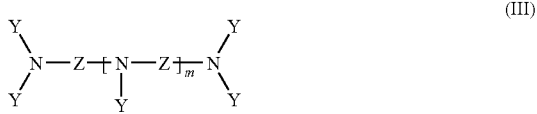

(III)

where Z is $C_{2-6}$-alkylene, cycloalkanediyl, phenylene, or $C_{2-6}$-alkylene, which is interrupted by cycloalkanediyl or phenylene, Y is $CH_2PO_3H_2$ and m is 0 to 4, such as ethylenediaminetetra(methylenephosphonic acid), diethylenetriaminepenta(methylenephosphonic acid) and bis(hexamethylene)triaminepenta(methylenephosphonic acid).

Phosphonic acids of the formula IV

(IV)

where R" is $C_{1-6}$-alkyl, $C_{2-6}$-hydroxyalkyl or Y and Y is $CH_2PO_3H_2$, such as nitrilotris-(methylenephosphonic acid) and 2-hydroxyethyliminobis(methylenephosphonic acid).

The phosphonic acids include 2-hydroxyphosphonoacetic acid, 2-phosphonobutane-1,2,4-tricarboxylic acid, 1-hydroxyethane-1,1-diphosphonic acid, ethylenediaminetetra (methylenephosphonic acid), diethylenetriaminepenta(methylenephosphonic acid), bis(hexamethylene)triaminepenta (methylenephosphonic acid) and nitrilotris (methylenephosphonic acid), of which 1-hydroxyethane-1,1-diphosphonic acid is particularly preferred.

The phosphonic acid is preferably added in the form of the free acid to the solution of the amine.

Alternatively, the phosphonic acid can be used in the form of a non-quaternary ammonium salt, i.e. as ammonium salt ($NH_4^+$ salt) or salt of a primary, secondary or tertiary ammonium ion. The free acid can be liberated from the non-quaternary ammonium salt under the conditions of regeneration of the absorption medium. Suitable ammonium salts are the protonated species of the amines which are used as component a) of the absorption medium.

The absorption medium according to the invention comprises at least one amine. Suitable amines include, in particular:

1. Alkanolamines (aminoalcohols) such as
2-aminoethanol (monoethanolamine, MEA), N,N-bis(2-hydroxyethyl)amine (diethanolamine, DEA), N,N-bis(2-hydroxypropyl)amine (diisopropanolamine, DIPA), tris(2-hydroxyethyl)amine (triethanolamine, TEA), tributanolamine, bis(2-hydroxyethyl)-methylamine (methyldiethanolamine, MDEA), 2-diethylaminoethanol (diethylethanolamine, DEEA), 2-dimethylaminoethanol (dimethylethanolamine, DMEA), 3-dimethylamino-1-propanol (N,N-dimethylpropanolamine), 3-diethylamino-1-propanol, 2-diisopropylaminoethanol (DIEA), N,N-bis (2-hydroxypropyl)methylamine (methyldiisopropanolamine, MDIPA), 2-amino-2-methyl-1-propanol (AMP), 1-amino-2-methyl-propan-2-ol, 2-amino-1-butanol (2-AB);
2. Aminoethers such as
2-(2-Aminoethoxy)ethanol (AEE), 2-(2-tert-butylaminoethoxy)ethanol (EETB), 3-methoxypropyldimethylamine;
3. 5-, 6- or 7-membered saturated heterocycles having at least one NH group in the ring which can comprise one or two other heteroatoms in the ring which are selected from nitrogen and oxygen, such as piperazine, 2-methylpiperazine, N-methylpiperazine, N-ethylpiperazine, N-aminoethylpiperazine, N-hydroxyethylpiperazine, homopiperazine, piperidine and morpholine;

4. Polyamines, e.g.

4.1 Alkylenediamines of the formula

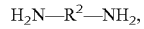

where $R^2$ is $C_2$-$C_6$-alkylene,
such as hexamethylenediamine, 1,4-diaminobutane, 1,3-diaminopropane, 2,2-dimethyl-1,3-diaminopropane, 4.2 Alkylenediamines of the formula

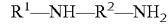

where $R^1$ is $C_1$-$C_6$-alkyl or $C_1$-$C_6$-hydroxyalkyl and $R^2$ is $C_2$-$C_6$-alkylene,
such as 3-methylaminopropylamine, N-(2-hydroxyethyl)ethylenediamine, 4.3 Alkylenediamines of the formula

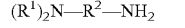

where $R^1$ is $C_1$-$C_6$-alkyl or $C_1$-$C_6$-hydroxyalkyl and $R^2$ is $C_2$-$C_6$-alkylene,
such as 3-(dimethylamino)propylamine (DMAPA) and 3-(diethylamino)propylamine, 4.4 Alkylenediamines of the formula

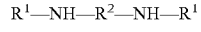

where $R^1$ is $C_1$-$C_6$-alkyl or $C_1$-$C_6$-hydroxyalkyl and $R^2$ is $C_2$-$C_6$-alkylene,
such as N,N'-bis(2-hydroxyethyl)ethylenediamine, 4.5 Bistertiary diamines such as
N,N,N',N'-tetramethylethylenediamine, N,N-diethyl-N',N'-dimethylethylenediamine, N,N,N',N'-tetraethylethylenediamine, N,N,N',N'-tetramethyl-1,3-propanediamine (TMPDA), N,N,N',N'-tetraethyl-1,3-propanediamine (TEPDA), N,N-dimethyl-N',N'-diethylethylenediamine (DMDEEDA), 1-dimethylamino-2-dimethylaminoethoxyethane (bis[2-(dimethylamino)ethyl]ether);

4.6 Polyalkylenepolyamines
such as diethylenetriamine, triethylenetetramine and tetraethylenepentamine, tris(3-aminopropyl)amine, tris(2-aminoethyl)amine;

and mixtures thereof.

Alkanolamines, i.e. amines having at least one hydroxyalkyl group bound to the nitrogen atom, are generally preferred.

In one embodiment, the absorption medium comprises solely amines having solely tertiary and/or sterically hindered amino groups. The absorption medium of this embodiment is particularly suitable for the selective removal of $H_2S$.

"Sterically hindered amino groups" in the present case is taken to mean
(i) a primary amino group which is bound to a tertiary carbon atom,
(ii) an amino group which is bound to a secondary or tertiary carbon atom, and
(iii) an amino group, wherein a tertiary or quaternary carbon atom is arranged in the β position to the amino group.

Preferred amines having solely tertiary amino groups are tris(2-hydroxyethyl)amine (triethanolamine, TEA), tris(2-hydroxypropyl)amine (triisopropanol), tributanolamine, bis (2-hydroxyethyl)methylamine (methyldiethanolamine, MDEA), 2-diethylaminoethanol (diethylethanolamine, DEEA), 2-dimethylaminoethanol (dimethylethanolamine, DMEA), 3-dimethylamino-1-propanol, 3-diethylamino-1- propanol, 2-diisopropylaminoethanol (DIEA), N,N-bis(2-hydroxypropyl)methylamine (methyldiisopropanolamine, MDIPA).

Preferred amines having solely sterically hindered amino groups are 2-amino-2-methyl-1-propanol (AMP) and 1-amino-2-methylpropan-2-ol.

In another embodiment, the absorption medium comprises at least one amine having solely tertiary and/or sterically hindered amino groups and at least one activator. The activator is customarily a primary or secondary amine and accelerates the uptake of carbon dioxide by intermediate formation of a carbamate structure. The absorption medium of this embodiment is suitable, particularly, for the energy-conserving, non-selective binding of acid gases. In the case of total absorption, at least one of the two components $H_2S$ or $CO_2$ is specified, wherein the other is depleted at the absorber head in accordance with the equilibrium thereof. It can also occur that a maximum outlet specification is established for one of the two acid gas components.

Examples of preferred amines having solely tertiary and/or sterically hindered amino groups are the above-mentioned.

Examples of preferred activators are piperazine, 2-methylpiperazine, N-methylpiperazine, N-hydroxyethylpiperazine, homopiperazine, piperidine, morpholine, 3-methylaminopropylamine and 2-(2-aminoethoxy)ethanol.

In another embodiment, the absorption medium comprises at least one (non-sterically hindered) primary and/or secondary amine. The absorption medium of this embodiment is suitable particularly for energy-saving non-selective removal of acid gases at low acid gas partial pressures.

Examples of preferred primary and/or secondary amines are 2-aminoethanol (monoethanolamine, MEA), N,N-bis(2-hydroxyethyl)amine (diethanolamine, DEA), N,N-bis(2-hydroxypropyl)amine (diisopropanolamine, DTPA).

Generally, the aqueous solution comprises 2 to 5 $kmol/m^3$, in particular 3.5 to 4.5 $kmol/m^3$ of amine.

The absorption medium can also comprise additives, such as corrosion inhibitors, enzymes, etc. Generally, the amount of such additives is in the range of about 0.01-3% by weight of the absorption medium.

The invention also relates to a process for the removal of acid gases from a fluid stream in which process the fluid stream is brought into contact with the above-defined absorption medium.

Generally, the loaded absorption medium is regenerated by
a) heating,
b) expansion,
c) stripping with an inert fluid
or a combination of two or all of these measures.

The process or absorption medium according to the invention is suitable for the treatment of fluids, in particular gas streams of all types. The acid gases are, in particular, $CO_2$, $H_2S$, and also COS and mercaptans. Furthermore, it is also possible to remove $SO_3$, $SO_2$, $CS_2$ and HCN. Fluids which comprise the acid gases are firstly gases such as natural gas, synthesis gas, coke oven gas, cracked gas, coal gasification gas, recirculated cycle gas, landfill gases and combustion gases, and secondly fluids which are essentially immiscible with the absorption medium, such as liquefied petroleum gas (LPG) or natural gas liquids (NGL). The process or absorption medium according to the invention is particularly suitable for the treatment of hydrocarbonaceous fluid streams. The hydrocarbons present are, e.g., aliphatic hydrocarbons such as $C_1$-$C_4$-hydrocarbons, such as methane, unsaturated hydrocarbons, such as ethylene or propylene, or aromatic hydrocarbons, such as benzene, toluene or xylene. The process or absorption medium according to the invention is particularly suitable for the removal of $CO_2$ and $H_2S$.

In preferred embodiments, the fluid stream is a
(i) hydrogen-comprising fluid stream or a hydrogen- and carbon-dioxide-comprising fluid stream; this includes synthesis gases which are producible, e.g. by coal gasification or steam reforming and are optionally subjected to a water gas shift reaction; the synthesis gases are used, e.g., for producing ammonia, methanol, formaldehyde, acetic acid, urea, for Fischer-Tropsch synthesis or for energy recovery in an Integrated Gasification Combined Cycle (IGCC) process
(ii) hydrocarbon-comprising fluid stream; this comprises, in addition to natural gas, exhaust gases of various refinery processes such as the tail gas unit (TGU), of a visbreaker (VDU), of a catalytic cracker (LRCUU/FCC), of a hydrocracker (HCU), of a hydrotreater (HDS/HTU), of a coker (DCU), of atmospheric distillation (CDU) or of a liquid treater (e.g. LPG).

The process according to the invention is suitable for the selective removal of hydrogen sulfide in the presence of $CO_2$. "Selective removal of hydrogen sulfide" is taken to mean that the following inequality is met $$\frac{\frac{c(H_2S)_{feed} - c(H_2S)_{treat}}{c(H_2S)_{feed}}}{\frac{c(CO_2)_{feed} - c(CO_2)_{treat}}{c(CO_2)_{feed}}} > 1$$

where $c(H_2S)_{feed}$ is the concentration of $H_2S$ in the feed fluid, $c(H_2S)_{treat}$ is the concentration in the treated fluid, $c(CO_2)_{feed}$ is the concentration of $CO_2$ in the feed fluid and $C(CO_2)_{treat}$ is the concentration of $CO_2$ in the treated fluid.

The selective removal of $H_2S$ is advantageous, e.g., a) for meeting a given $H_2S$ specification when the maximum acid gas total absorption capacity of the absorption medium is already reached and b) for setting a higher $H_2S/CO_2$ ratio in the acid gas stream which is liberated in the regeneration of the absorption medium and which is typically run in a Claus plant. An acid gas stream having a higher $H_2S/CO_2$ ratio has a higher calorific value and suppresses the formation of COS (from $CO_2$) which impairs the running time of the Claus catalyst.

In the process according to the invention the feed fluid which is rich in acid gas components (crude gas) is contacted with the absorption medium in an absorber in an absorption step, as a result of which the acid gas components are at least in part scrubbed out.

Preferably a scrubbing device used in customary gas scrubbing processes functions as absorber. Suitable scrubbing devices are, for example, dumped-bed packing materials, arranged packing and tray columns, membrane contactors, radial stream scrubbers, jet scrubbers, venturi scrubbers and rotary spray scrubbers, preferably arranged packing, dumped-bed packing and tray columns, particularly preferably tray and dumped-bed packing columns. The fluid stream is treated with the absorption medium preferably in a column in countercurrent flow. The fluid in this case is generally fed into the lower region of the column and the absorption medium into the upper region of the column. In tray columns, sieve trays, bubble-cap trays or valve trays are installed, over which the liquid flows. Dumped-bed packing columns can be packed with differently shaped bodies. Heat exchange and mass transfer are improved by the enlargement of the surface area of the shaped bodies which are usually about 25 to 80 mm in size. Known examples are the Raschig ring (a hollow cylinder), Pall ring, Hiflow ring, Intalox saddle and the like. The dumped-bed packing materials can be introduced into the column in an arranged manner or else randomly (as a bed). Materials which come into consideration are glass, ceramic, metal and plastics. Structured packings are a further development of arranged dumped-bed packing materials. They have a regularly shaped structure. As a result, it is possible in the case of arranged packings to reduce pressure drops in the gas flow. There are various designs of arranged packings, e.g. fabric or sheet packings. Materials which can be used are metal, plastic, glass and ceramic.

The temperature of the absorption medium in the absorption step is generally about 30 to 100° C., when a column is used, for example 30 to 70° C. at the top of the column and 50 to 100° C. at the bottom of the column. The total pressure in the absorption step is generally about 1 to 120 bar, preferably about 10 to 100 bar.

A product gas which is low in acid gas components, i.e. a product gas which is depleted in these components (clean gas) and an absorption medium which is loaded with acid gas components are obtained. The process according to the invention can comprise one or more, in particular two, sequential absorption steps. The absorption can be carried out in a plurality of sequential part steps, wherein the crude gas comprising the acid gas components is contacted in each of the part steps in each case with a substream of the absorption medium. The absorption medium which is contacted with the crude gas can already be in part loaded with acid gases, i.e. it can be, for example, an absorption medium which has been recirculated from a subsequent absorption step to the first absorption step, or a partially regenerated absorption medium. With respect to the procedure of the two-stage absorption, reference is made to the publications EP-A 0 159 495, EP-A 0 20 190 434, EP-A 0 359 991 and WO 00/00271.

According to a preferred embodiment, the process according to the invention is carried out in such a manner that the acid-gas-comprising fluid is first treated in a first absorption step with the absorption medium at a temperature of 40 to 100° C., preferably 50 to 90° C., and in particular 60 to 90° C. The fluid depleted in acid gases is then treated in a second absorption step with the absorption medium at a temperature of 30 to 90° C., preferably 40 to 80° C., and in particular 50 to 80° C. In this case the temperature is 5 to 20° C. lower than in the first absorption step.

The acid gas components can be liberated from the absorption medium which is loaded with the acid gas components in a regeneration step in a conventional manner (similar to the publications cited hereinafter), wherein a regenerated absorption medium is obtained. In the regeneration step, the loading of the absorption medium is reduced and the resultant regenerated absorption medium is preferably subsequently recirculated to the absorption step.

Generally, the regeneration step comprises at least one pressure expansion of the loaded absorption medium from a high pressure, such as prevails in the procedure of the absorption step, to a lower pressure. The pressure expansion can be performed, for example, by means of a throttle valve and/or an expansion turbine. The regeneration using an expansion stage is described by way of example in the publications U.S. Pat. Nos. 4,537,753 and 4,553,984.

The liberation of the acid gas components in the regeneration step can proceed, for example, in an expansion column, e.g. a vertically or horizontally installed flash vessel, or a countercurrent flow column having internals.

The regeneration column can likewise be a dumped-bed packing, arranged-packing or tray column. The regeneration column has at the bottom a reboiler, e.g. a forced circulation evaporator having a circulating pump. At the top the regeneration column has an outlet for the liberated acid gases. Entrained absorption medium vapors are condensed in a condenser and recirculated to the column.

A plurality of expansion columns can be connected in series, in which regeneration is performed at differing pressures. For example, regeneration can be performed in a pre-expansion column at high pressure which is typically about 1.5 bar above the partial pressure of the acid gas components in the absorption step, and in a main expansion column at low pressure, for example 1 to 2 bar absolute. The regeneration using two or more expansion stages is described in the publications U.S. Pat. Nos. 4,537,753, 4,553,984, EP-A 0 159 495, EP-A 0 202 600, EP-A 0 190 434 and EP-A 0 121 109.

A process variant having two low-pressure expansion stages (1 to 2 bar absolute) in which the absorption liquid partially regenerated in the first low-pressure expansion stage is heated, and in which a medium-pressure expansion stage is optionally provided upstream of the first low-pressure expansion stage, in which medium-pressure expansion stage expansion is performed to at least 3 bar, is described in DE 100 28 637. In this case the loaded absorption liquid is first expanded in a first low-pressure expansion stage to a pressure of 1 to 2 bar (absolute). Subsequently the partially regenerated absorption liquid is heated in a heat exchanger and then, in a second low-pressure expansion stage, expanded to a pressure of 1 to 2 bar (absolute).

The last expansion stage can also be carried out under vacuum which is generated, for example, by means of a steam-jet ejector, optionally in combination with a mechanical vacuum-generation apparatus, as described in EP-A 0 159 495, EP-A 0 202 600, EP-A 0 190 434 and EP-A 0 121 109 (U.S. Pat. No. 4,551,158).

Because of the optimal matching of the content to the amine component, the absorption medium according to the invention has a high absorption capacity with acid gases which can also be readily desorbed again. As a result, the energy consumption and the solvent circulation in the process according to the invention can be significantly reduced.

The invention will be described in more detail with reference to the accompanying drawing and the example hereinafter.

FIG. 1 is a schematic drawing of a plant suitable for carrying out the process according to the invention.

According to FIG. 1, via a feed line 1, a suitably pretreated acid-gas-comprising gas is contacted in an absorber 2 in countercurrent flow with the regenerated absorption medium which is fed via the absorption medium line 3. The absorption medium removes acid gases from the gas by absorption; in this case an acid-gas-low clean gas is obtained via an exhaust gas line 4.

Via an absorption medium line 5, a pump 12, a solvent-solvent heat exchanger 11 in which the acid-gas-loaded absorption medium is heated by the heat of the regenerated absorption medium exiting from the bottom of the desorption column 7, and a throttle valve 6, the acid-gas-loaded absorption medium is fed to a desorption column 7. In the bottom part of the desorption column 7 the loaded absorption medium is heated by means of a reboiler (which is not shown) and regenerated. The acid gas which is liberated in this process leaves the desorption column 7 via the exhaust gas line 8. The regenerated absorption medium is subsequently fed back to the absorption column 2 by means of a pump 9 via the solvent-solvent heat exchanger 11 in which the regenerated absorption medium heats the acid-gas-loaded absorption medium and is itself cooled in this process, and a heat exchanger 10.

COMPARATIVE EXAMPLE 1 AND EXAMPLE 2

A 39% strength by weight (32.8 mol %) solution of methyldiethanolamine was produced. Aliquots of 200 ml were admixed with 1% by weight of orthophosphoric acid ($H_3PO_4$) or 1.2% strength by weight 1-hydroxyethane-1,1-diphosphonic acid (HEDP).

The two solutions were loaded up to equilibrium with $H_2S$ at 50° C. at atmospheric pressure. The $H_2S$ equilibrium loading was determined by potentiometric titration against silver nitrate.

Subsequently the solutions, for simulation of the regeneration process, were boiled in an Erlenmeyer flask having an attached reflux condenser at a constant 100° C. in an oil bath. In this process in each case 10 l (S.T.P.)/h of nitrogen gas were bubbled through the liquid in order to improve the exchange between gas and liquid phase and to remove the liberated $H_2S$ via the cooler.

After defined time intervals, in each case samples of 20 ml were taken and the $H_2S$ content again determined by potentiometric titration against silver nitrate. The results are summarized in the table hereinafter.

|  | Example | |
|---|---|---|
|  | 1 | 2 |
| Promoter | $H_3PO_4$ | HEDP |
| $H_2S$ equilibrium loading at 50° C. [m³ (S.T.P.)]$_{H2S}$/t | 46.9 | 46.8 |
| $H_2S$ loading based on initial value [%] after | | |
| 0 min | 100.0 | 100.0 |
| 15 min | 40.5 | 18.7 |
| 45 min | 14.2 | 6.7 |
| 105 min | 3.9 | 1.6 |
| 225 min | 1.3 | 0 |
| 405 min | 0.4 | 0 |

It can be seen from the experimental results that a regeneration to a given residual loading (e.g. less than 2%) is achieved more rapidly in example 2 (with HEDP) than in comparative example 1. Since in the experimental arrangement selected the energy input is proportional to the product of the constant heat flow rate and time, the required regeneration energy in example 2 is significantly lower.

COMPARATIVE EXAMPLES 3 AND 5 AND EXAMPLES 4 AND 6

An aqueous solution of 37% by weight of MDEA+3% by weight of piperazine (total amine concentration 40% by weight; 33.3 mol %) was produced (termed activated MDEA). An aliquot of 200 ml was admixed with 1.2% by weight (0.6 mol %) of 1-hydroxyethane-1,1-diphosphonic acid (HEDP). A further aliquot served as control.

Two experimental series were carried out. In the first series, the solutions were loaded up to equilibrium with $CO_2$ at 50° C. at atmospheric pressure, and in the second experimental series at 70° C. The $CO_2$ equilibrium loading was determined by titration with KOH.

Subsequently, the solutions, for simulation of the regeneration process, were boiled in an Erlenmeyer having an attached reflux condenser at a constant 100° C. in an oil bath. In this case, in each case 10 l (S.T.P.)/h of nitrogen gas were bubbled through the liquid in order to improve the exchange between gas and liquid phases and to remove the liberated $CO_2$ via the condenser.

After defined time intervals, in each case samples of 20 ml were taken and the $CO_2$ content again determined by titration with KOH. The results are summarized in the table hereinafter.

|  | Example | | | |
|---|---|---|---|---|
|  | 3 (50° C.) | 4 (50° C.) | 5 (70° C.) | 6 (70° C.) |
| Promoter | — | HEDP | — | HEDP |
| $CO_2$ equilibrium loading [m³ (S.T.P.)]$_{CO2}$/t | 43.5 | 43.0 | 26.4 | 25.6 |
| $CO_2$ loading based on initial value [%] after | | | | |
| 0 min | 100.0 | 100.0 | 100.0 | 100.0 |
| 15 min | 12.7 | 11.2 | 29.9 | 22.3 |
| 45 min | 4.4 | 4.9 | 7.3 | 3.6 |
| 105 min | 1.8 | 0.7 | 2.6 | 0.7 |
| 225 min | 0.9 | 0.4 | 1.2 | 0.5 |
| 405 min | 0.9 | 0.7 | 0.8 | 0.6 |

It is clear from the experimental results that regeneration to a given residual loading (e.g. less than 2%) is achieved more rapidly in examples 4 and 6 (with HEDP) than in the comparative examples 3 and 5. Since in the experimental arrangement selected the energy input is proportional to the product of the constant heat flow rate and time, the required regeneration energy is significantly lower in examples 4 and 6.

The invention claimed is:

1. An absorption medium for the removal of acid gases from a fluid stream which comprises an aqueous solution
    a) of at least one amine and
    b) at least one phosphonic acid,
    wherein the molar ratio of b) to a) is in the range from 0.0005 to 0.1, and wherein the aqueous solution comprises 2 to 5 kmol/m³ of amine.

2. The absorption medium according to claim 1, wherein the molar ratio of b) to a) is in the range from 0.01 to 0.1.

3. The absorption medium according to claim 1, wherein the phosphonic acid is selected from
    phosphonic acids of the formula I

$$R-PO_3H \quad (I)$$

where R is $C_1$-$C_{18}$-alkyl, which is optionally substituted by up to four substituents which are independently selected from carboxyl, carboxamido, hydroxy and amino,
phosphonic acids of the formula II

$$(II)$$

where R' is H or $C_{1-6}$-alkyl, Q is H, OH or $NY_2$ and Y is H or $CH_2PO_3H_2$, phosphonic acids of the formula III

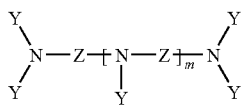

where Z is $C_{2-6}$-alkylene, cycloalkanediyl, phenylene, or $C_{2-6}$-alkylene, which is interrupted by cycloalkanediyl or phenylene, Y is $CH_2PO_3H_2$ and m is 0 to 4,
phosphonic acids of the formula IV $$R''\!-\!NY_2 \quad (IV)$$

where R" is $C_{1-6}$-alkyl, $C_{2-6}$-hydroxyalkyl or Y and Y is $CH_2PO_3H_2$.

4. The absorption medium according to claim 3, wherein the phosphonic acid comprises 1-hydroxyethane-1,1-diphosphonic acid.

5. The absorption medium according to claim 1, wherein the amine comprises at least one alkanolamine.

6. The absorption medium according to claim 1, wherein the amine comprises solely amines having solely tertiary and/or sterically hindered amino groups.

7. The absorption medium according to claim 1, wherein the amine comprises at least one amine having solely tertiary and/or sterically hindered amino groups and at least one activator.

8. The absorption medium according to claim 6, wherein the amine having solely tertiary amino groups is selected from tris(2-hydroxyethyl)amine, tris(2-hydroxypropyl)amine, tributanolamine, bis(2-hydroxyethyl)methylamine, 2-diethylaminoethanol, 2-dimethylaminoethanol, 3-dimethylamino-1-propanol, 3-diethylamino-1-propanol, 2-diisopropylaminoethanol and N,N-bis(2-hydroxypropyl)methylamine; and the amine having solely sterically hindered amino groups is selected from 2-amino-2-methyl-1-propanol and 1-amino-2-methylpropan-2-ol.

9. The absorption medium according to claim 7, wherein the activator is selected from piperazine, 2-methylpiperazine, N-methylpiperazine, homopiperazine, piperidine, morpholine, 3-methylaminopropylamine and 2-(2-aminoethoxy)ethanol.

10. The absorption medium according to claim 1, wherein the amine comprises at least one primary amine and/or secondary amine.

11. The absorption medium according to claim 10, wherein the primary amine and/or secondary amine is selected from 2-aminoethanol, N,N-bis(2-hydroxyethyl)amine and N,N-bis(2-hydroxypropyl)amine.

12. A process for the removal of acid gases from a fluid stream in which process the fluid stream is brought into contact with an absorption medium according to claim 1.

13. The process according to claim 12 wherein hydrogen sulfide is selectively removed from the fluid stream.

14. The process according to claim 12, wherein the fluid stream comprises hydrocarbons.

15. The process according to claim 12, wherein the loaded absorption medium is regenerated by
  a) heating,
  b) expansion,
  c) stripping with an inert fluid
or a combination of two or all of these measures.

16. The absorption medium according to claim 2, wherein the phosphonic acid is selected from
phosphonic acids of the formula I $$R\!-\!PO_3H \quad (I)$$

where R is $C_1$-$C_{18}$-alkyl, which is optionally substituted by up to four substituents which are independently selected from carboxyl, carboxamido, hydroxy and amino,
phosphonic acids of the formula II

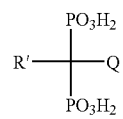

where R' is H or $C_{1-6}$-alkyl, Q is H, OH or $NY_2$ and Y is H or $CH_2PO_3H_2$,
phosphonic acids of the formula III

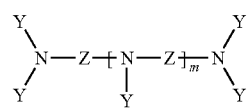

where Z is $C_{2-6}$-alkylene, cycloalkanediyl, phenylene, or $C_{2-6}$-alkylene, which is interrupted by cycloalkanediyl or phenylene, Y is $CH_2PO_3H_2$ and m is 0 to 4,
phosphonic acids of the formula IV $$R''\!-\!NY_2 \quad (IV)$$

where R" is $C_{1-6}$-alkyl, $C_{2-6}$-hydroxyalkyl or Y and Y is $CH_2PO_3H_2$.

17. The absorption medium according to claim 2, wherein the amine comprises at least one alkanolamine.

18. The absorption medium according to claim 3, wherein the amine comprises at least one alkanolamine.

* * * * *